United States Patent
Zhao et al.

(10) Patent No.: US 9,895,983 B2
(45) Date of Patent: Feb. 20, 2018

(54) PROPULSION SYSTEM AND METHOD FOR DRIVING A VEHICLE

(71) Applicant: General Electric Company, Schenectady, NY (US)

(72) Inventors: Tong Zhao, Shanghai (CN); Xi Lu, Shanghai (CN); Ronghui Zhou, Shanghai (CN); Fei Li, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 634 days.

(21) Appl. No.: 14/511,362

(22) Filed: Oct. 10, 2014

(65) Prior Publication Data

US 2015/0102667 A1 Apr. 16, 2015

(30) Foreign Application Priority Data

Oct. 11, 2013 (CN) .......................... 2013 1 0472988

(51) Int. Cl.
*B60L 11/18* (2006.01)
*B60L 11/12* (2006.01)
(Continued)

(52) U.S. Cl.
CPC .......... *B60L 11/1803* (2013.01); *B60L 11/12* (2013.01); *B60L 11/1868* (2013.01);
(Continued)

(58) Field of Classification Search
CPC .............. B60L 11/1803; B60L 11/1868; B60L 15/2045; B60L 11/12; B60L 2210/10;
(Continued)

(56) References Cited

U.S. PATENT DOCUMENTS

| 6,265,851 B1 * | 7/2001 | Brien | B60L 11/005 320/137 |
|---|---|---|---|
| 7,595,597 B2 * | 9/2009 | King | B60K 6/28 318/106 |

(Continued)

FOREIGN PATENT DOCUMENTS

| CN | 101992678 A | 3/2011 |
|---|---|---|
| CN | 201914107 U | 8/2011 |
| JP | 2013062979 A | 4/2013 |

OTHER PUBLICATIONS

Miller et al., "Ultracapacitor Enabled Gatekeeper Energy Management Strategy for Single Mode eCVT Hybrid Vehicle Propulsion", Vehicle Power and Propulsion Conference, 2006. VPPC '06, pp. 1-6, Sep. 2006.

(Continued)

*Primary Examiner* — Jared Fureman
*Assistant Examiner* — Emmanuel R Dominique
(74) *Attorney, Agent, or Firm* — Meagher Emanuel Laks Goldberg & Liao, LLP.

(57) ABSTRACT

A propulsion system includes a traction drive system, a boost converter, an energy-type energy source, a power-type energy source, and an energy management system. The boost converter includes a high voltage side and a low voltage side. The boost converter is coupled to the traction drive system on the high voltage side. The energy-type energy source is coupled to the boost converter on the low voltage side thereof. The power-type energy source is coupled to the boost converter on the low voltage side thereof. The energy management system is coupled to the boost converter and configured to control the energy-type energy source and the power-type energy source through the boost converter in at least two conditions during a motoring mode.

20 Claims, 8 Drawing Sheets

(51) Int. Cl.
*B60L 11/08* (2006.01)
*B60L 15/20* (2006.01)

(52) U.S. Cl.
CPC ....... *B60L 15/2045* (2013.01); *B60L 2210/10* (2013.01); *Y02T 10/645* (2013.01); *Y02T 10/7005* (2013.01); *Y02T 10/7066* (2013.01); *Y02T 10/7077* (2013.01); *Y02T 10/7216* (2013.01); *Y02T 10/7283* (2013.01)

(58) Field of Classification Search
CPC ............... Y02T 10/645; Y02T 10/7216; Y02T 10/7066; Y02T 10/7283; Y02T 10/7077; Y02T 10/7005
See application file for complete search history.

(56) References Cited

U.S. PATENT DOCUMENTS

| | | | | |
|---|---|---|---|---|
| 7,859,202 | B2* | 12/2010 | Lukic | B60L 11/005 180/65.21 |
| 8,120,290 | B2 | 2/2012 | King | |
| 8,378,623 | B2 | 2/2013 | Kusch et al. | |
| 8,922,057 | B2 | 12/2014 | King et al. | |
| 2006/0250902 | A1* | 11/2006 | Bender | B60K 6/30 369/1 |
| 2007/0164693 | A1* | 7/2007 | King | B60K 6/28 318/109 |
| 2010/0133025 | A1* | 6/2010 | Flett | B60K 6/46 180/65.22 |
| 2011/0204851 | A1* | 8/2011 | Manotas, Jr. | B60L 11/1816 320/128 |
| 2013/0038127 | A1* | 2/2013 | King | B60L 11/1857 307/64 |
| 2013/0138279 | A1* | 5/2013 | Shi | B60L 1/00 701/22 |
| 2015/0105947 | A1* | 4/2015 | Chang | B60L 11/1861 701/22 |

OTHER PUBLICATIONS

Rajneesh et al., "Model Based Power-Split and Control for Electric Energy System in a Hybrid Electric Vehicle", ASME International Mechanical Engineering Congress and Exposition, pp. 1-7, Nov. 2006.
Li et al., "Power Distribution Strategy of Fuel Cell Vehicle System with Hybrid Energy Storage Elements Using Triple Half Bridge (THB) Bidirectional DC-DC converter", Industry Applications Conference, 2007. 42nd IAS Annual Meeting. Conference Record of the 2007 IEEE, pp. 636-642, Sep. 2007.
Rosario., "Power and Energy Management of Multiple Energy Storage System in Electric Vehicles", Ph.D. thesis, Department of Aerospace Power and Sensors, Cranifield University UK, 2008.
Payman et al., "Energy Control of Supercapacitor/Fuel Cell Hybrid Power Source", Institut National Polytechnique de Lorraine, pp. 1637-1644, vol. 49, Issue 6, Jun. 2008.
Carter et al., "Strategies for Control of A Battery/Supercapacitor System in an Electric Vehicle", International Symposium on Power Electronics, Electrical Drives, Automation and Motion, pp. 727-732, Jun. 2008.
Carter et al., "Optimizing for Efficiency or Battery Life in a Battery/Supercapacitor Electric Vehicle", IEEE Trans. Vehicular Technology, pp. 1526-1533, vol. 61, Issue 4, May 2012.
Unofficial English Translation of Chinese Office Action issued in connection with corresponding CN Application No. 201310472983.7 dated Apr. 1, 2016.

* cited by examiner

PROPULSION SYSTEM AND METHOD FOR DRIVING A VEHICLE

BACKGROUND

Embodiments of the invention relate generally to a propulsion system and a method, and more particularly, relate to a propulsion system and a method for providing power to a vehicle by an energy-type energy source and a power-type energy source.

An energy-type energy source, such as battery, is usually employed to provide power to a traction drive system and capture regenerative energy in electric, and hybrid electric vehicles. However, the energy-type energy source cannot handle fast driving dynamics during motoring and regenerating. Hence, a power-type energy source, such as ultra-capacitor, may be a good complementary. Therefore, the energy-type energy source and the power-type energy source integrating with one or more DC-DC converters may be a suitable candidate to provide power for the vehicle. A required power for the traction drive system may be split between the energy-type energy source and the power-type energy source. Currently, the required power is split only according to state-of-charges of the energy-type energy source and the power-type energy source. However, the energy management strategy has low driving train efficiency.

It is desirable to provide a propulsion system and a method to address at least one of the above-mentioned problems.

BRIEF DESCRIPTION OF THE INVENTION

In accordance with one embodiment disclosed herein, a propulsion system is provided. The propulsion system includes a fraction drive system, a boost converter, an energy-type energy source, a power-type energy source, and an energy management system. The boost converter includes a high voltage side and a low voltage side. The boost converter is coupled to the traction drive system on the high voltage side. The energy-type energy source is coupled to the boost converter on the low voltage side thereof. The power-type energy source is coupled to the boost converter on the low voltage side thereof. The energy management system is coupled to the boost converter and configured to control the energy-type energy source and the power-type energy source through the boost converter in at least two conditions during a motoring mode: when a required power for the traction drive system is below a power threshold, control the energy-type energy source to provide power to the traction drive system; and when the required power for the traction drive system is above the power threshold, control both the energy-type energy source and the power-type energy source to provide power to the traction drive system.

In accordance with another embodiment disclosed herein, a method is provided. The method includes providing an energy-type energy source and a power-type energy source. The method further includes providing power via the energy-type energy source and the power-type energy source to a traction drive system in at least two conditions during a motoring mode: when a required power for the traction drive system is below a power threshold, providing power via the energy-type energy source to the traction drive system; and when the required power for the traction drive system is above the power threshold, providing power via both the energy-type energy source and the power-type energy source to the traction drive system.

BRIEF DESCRIPTION OF THE DRAWINGS

These and other features and aspects of the present disclosure will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "a", and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect.

Figure 1:
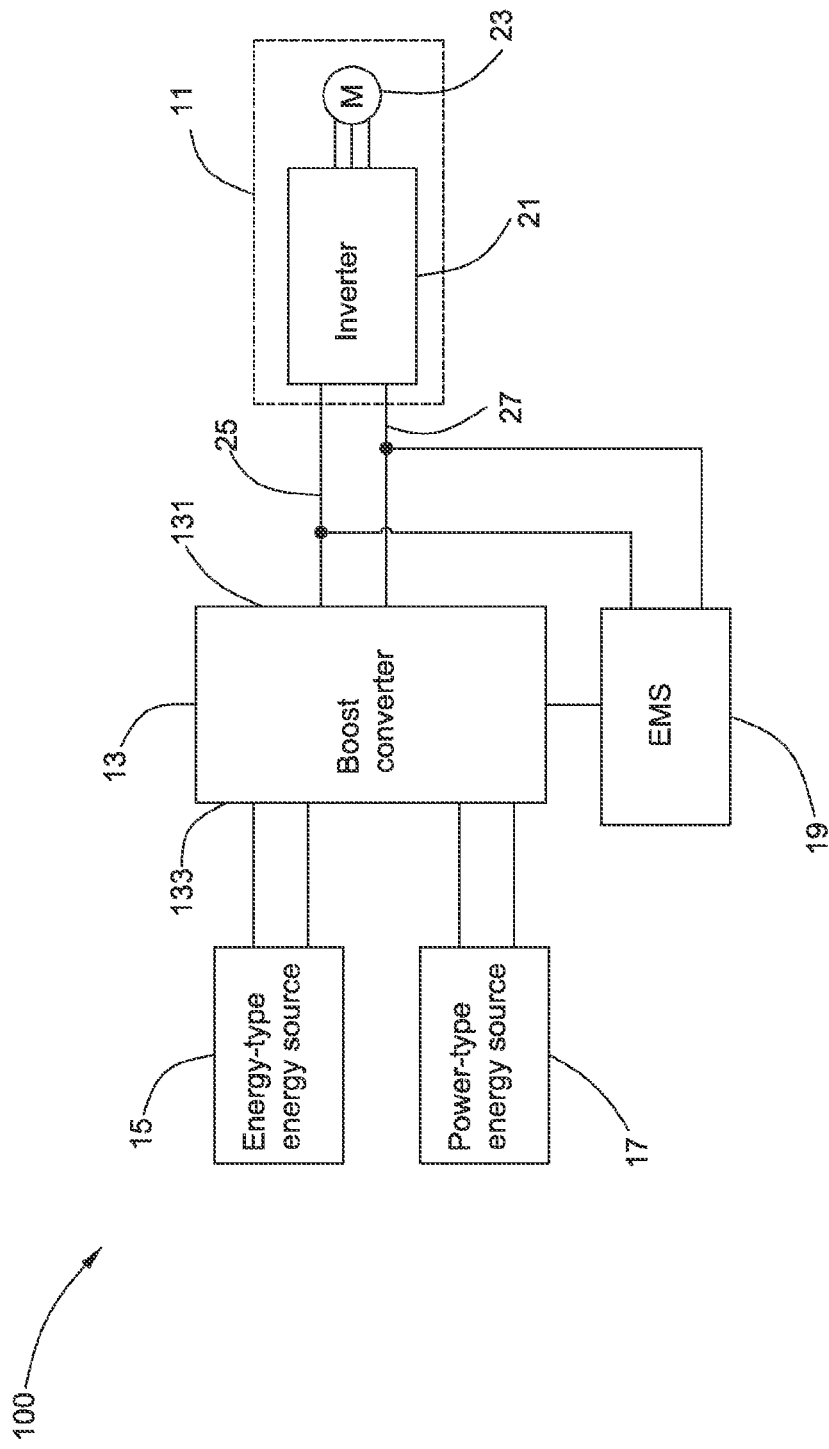
FIG. 1 is a schematic diagram of a propulsion system for a vehicle in accordance with an embodiment.

FIG. 1 illustrates a schematic diagram of a propulsion system 100 for a vehicle in accordance with an embodiment. The vehicle may be, for example, an electric vehicle or a hybrid vehicle. The hybrid vehicle as used herein represents a vehicle that utilizes a combination of an electric motor and a heat engine to provide propulsive force to the vehicle. Moreover, as used herein, an electrical vehicle represents a vehicle that includes a motor and a plurality of batteries, wherein the batteries provide at least a portion of the propulsive force to operate the vehicle.

The propulsion system 100 includes a traction drive system 11, a boost converter 13, an energy-type energy source 15, a power-type energy source 17, and an energy management system (EMS) 19. The traction drive system 11 includes an inverter 21 and a motor 23 coupled to the inverter 21. In one embodiment, the traction drive system 11 is an alternating current (AC) traction drive system. The inverter 21 is a direct current (DC)-AC inverter, and the motor 23 utilizes an AC motor. The DC-AC inverter 21 is coupled to the boost converter 13 through a pair of DC links 25 and 27 to convert DC to AC for the AC motor 23. One of the DC links 25 and 27 is a positive DC link and the other is a negative DC link. The term DC link is used herein to refer to DC bus. In another embodiment, the inverter 21 is a DC chopper or pulse width modulation circuit for providing DC, and the motor 23 is a DC motor.

The boost converter 13 includes a high voltage side 131 and a low voltage side 133. The traction drive system 11 is coupled to the boost converter 13 on the high voltage side 131, and the energy-type energy source 15 and the power-type energy source 17 are coupled to the boost converter 13 on the low voltage side 133. The boost converter 13 is configured to boost voltage from the low voltage side 133 to the high voltage side 131. In this embodiment, the boost converter 13 is a multi-channel bi-directional boost converter. The energy-type energy source 15 and the power-type energy source 17 are coupled to respective channels of the boost converter 13 to be controlled respectively. In another embodiment, a buck-boost converter is employed to act as the boost converter 13 to boost the voltage.

The energy-type energy source 15 is capability of providing and receiving power. The term energy-type energy source used herein describes a high specific energy source or high energy density energy source demonstrated to achieve an energy density on the order of 100 W-hr/kg or greater. The energy-type energy source 15 has a large capacity to provide large energy. The energy-type energy source 15, in one example, may include a battery or a string of batteries, such as fuel cell, lead-acid cell for example. The power-type energy source 17 is also capability of providing and receiving power. The power-type energy source 17 can provide high current instantly and receive energy with a high rate so as to handle fast driving dynamics. The power-type energy source 17 may include, for example, an ultracapacitor. Ultracapacitors are often referred to as "double-layer" capacitors or supercapacitors. In one example, the ultracapacitor has 63 cells connected in series wherein each cell has voltage rating of approximately 2.7 volts and a capacitance value that is greater than 1000 Farads per cell.

The EMS 19 is coupled to the boost converter 13 and configured to control the energy-type energy source 15 and the power-type energy source 17 through the boost converter 13 in multiple operation conditions that will be discussed later herein. The EMS 19 is coupled to the DC links 25 and 27 to receive signal therefrom, such as DC-link voltage and current.

Figure 2:
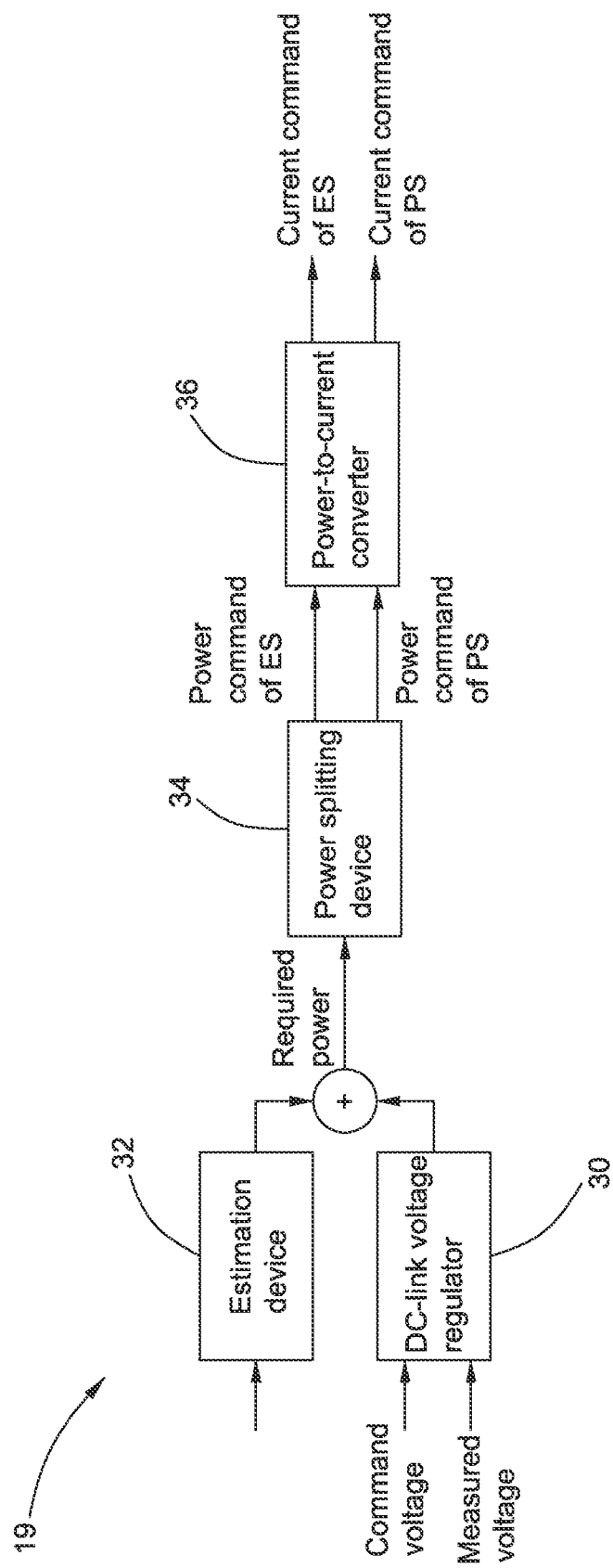
FIG. 2 is a schematic diagram of an energy management system of the propulsion system of FIG. 1 in accordance with an embodiment.

FIG. 2 illustrates a schematic diagram of the EMS 19 in accordance with an embodiment. With reference of FIG. 1, the EMS 19 is configured to determine a required power of the traction drive system 11 according to a command voltage of the DC links 25, 27 and a measured voltage of the DC links 25, 27. The required power as used herein represents a power required by the traction drive system 11. The required power may have positive values and negative values in different operation conditions. The command voltage of the DC links 25, 27, in one embodiment, may be calculated according to loss parameters of the motor 23 and the inverter 21. The command voltage, in another embodiment, may be obtained by experimental test. The command voltage of the DC links 25, 27 is determined to maximize the efficiency of the traction drive system 11. One or more sensors (not shown) may be provided to measure the measured voltage from the DC links 25, 27. In one embodiment, the EMS 19 includes a DC-link voltage regulator 30 configured to determine the required power according to the command voltage and the measured voltage of the DC links 25, 27. The DC-link voltage regulator 30 may include a control loop (not shown) configured to calculate the required power by keeping the measured voltage following the command voltage.

In this embodiment, the EMS 19 is further configured to estimate an estimated load power of the traction drive system 11 and determine the required power according to the estimated load power. The EMS 19 further includes an estimation device 32 configured to estimate the estimated load power according to a command torque for the motor 23 and a motor rotation speed. In one example, the command torque may be input via input devices, such as pedal and brake. In one example, the motor rotation speed may be measured from the motor 23. The required power is determined by adding the estimated load power from the estimation device 32 and the power generated by the DC-link voltage regulator 30 so that the response can be fastened.

The EMS 19 includes a power splitting device 34 configured to split the required power between the energy-type energy source 15 and the power-type energy source 17 according to different operation conditions and generate power commands of the energy-type energy source 15 (abbreviated to "ES" in figures) and the power-type energy source 17 (abbreviated to "PS" in figures). The EMS 19 includes a power-to-current converter 36 configured to convert the power commands from the power splitting device 34 to current commands. The current commands are applied to the boost converter 13 to control the corresponding channels of the boost converter 13 so as to control the energy-type energy source 15 and the power-type energy source 17 respectively to provide power for the traction drive system 11 corresponding to the power commands.

Figure 3:
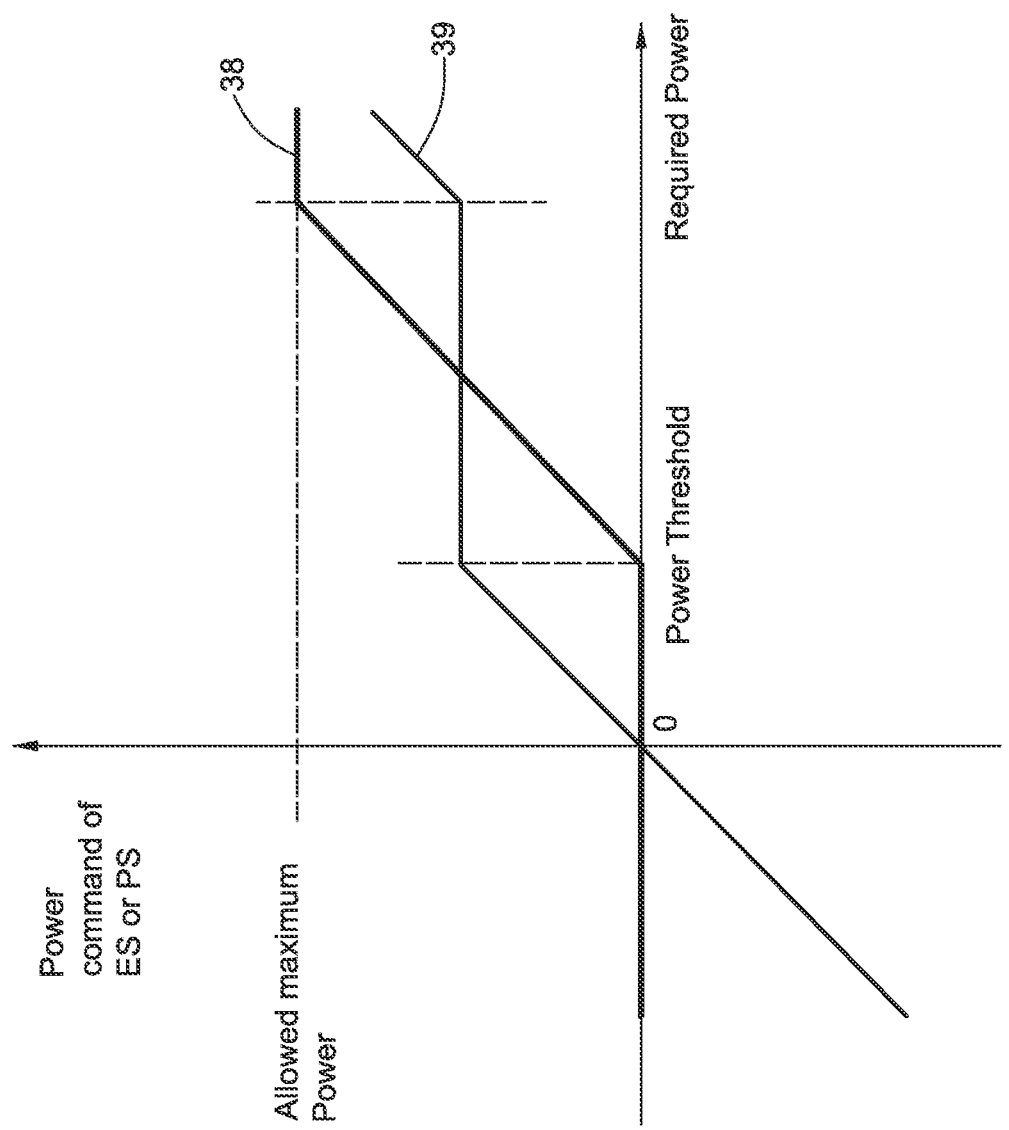
FIG. 3 is a graphical illustration of an energy management strategy in accordance with an embodiment.

FIG. 3 illustrates a graphical illustration of an energy management strategy in accordance with an embodiment. The abscissa axis represents the required power of the traction drive system 11, and the ordinate axis represents the power command of the energy-type energy source 15 or the power-type energy source 17. Wave 38 illustrates a relationship between the power command of the power-type energy source 17 and the required power of the traction drive system 11, and wave 39 illustrates a relationship between the power command of the energy-type energy source 15 and the required power of the traction drive system 11.

With reference of FIG. 1, the propulsion system 100 may operate in a motoring mode and a regenerating mode. Under the motoring mode, such as navigating and accelerating, the energy sources 15 and/or 17 provide power to the traction drive system 11 to drive the vehicle. Under the regenerating mode, such as braking, the energy sources 15 and/or 17 receive power from the traction drive system 11. In this embodiment, the propulsion system 100 operates in the motoring mode when the required power for the traction drive system 11 is positive, otherwise, the propulsion system 100 operates in the regenerating mode. In this embodiment, a sum of power commands of the energy-type energy source 15 and the power-type energy source 17 is equal to the required power. In another embodiment, any other energy source, such as a combustion engine, is utilized to provide power.

In the motoring mode, the EMS 19 controls the energy-type energy source 15 and the power-type energy source 17 through the boost converter 13 in at least two conditions. In one condition that the required power for the traction drive system 11 is below a power threshold, the EMS 19 controls the energy-type energy source 15 to provide power to the traction drive system 11. In this embodiment, the energy-type energy source 15 provides the required power.

In another condition that the required power for the traction drive system 11 is above the power threshold, the EMS 19 controls both the energy-type energy source 15 and the power-type energy source 17 to provide power to the traction drive system 11. In this embodiment, the EMS 19 controls the energy-type energy source 15 to provide power being equal to the power threshold to the traction drive system 11 when power provided by the power-type energy source 17 is less than an allowed maximum power thereof. The power-type energy source 17, in this embodiment, provides the rest of the required power. The allowed maximum power represents a maximum power which the power-type energy source 17 can apply and is determined according to the capacity of the power-type energy source 17. In another embodiment, the energy-type energy source 15 provides the power that rises a bit with the required power rising, and the power-type energy source 17 provides the rest of the required power.

The EMS 19 controls the power-type energy source 17 to provide the allowed maximum power thereof when the required power is higher than a sum of the allowed maximum power and the power threshold in the condition that the required power is above the power threshold. The EMS 19 controls the energy-type energy source 15 provides the rest of the required power.

The power threshold is determined according to lifetime of the energy-type energy source 15 and abilities of the power-type energy source 17 on discharging and charging, in order to protect the energy-type energy source 15, extend life of the energy-type energy source 15, and rational use the capacity of the power-type energy source 17. The power threshold, in one embodiment, is substantial half of an average value of the required power for the traction drive system 11. The energy-type energy source 15 provides a smooth power and the power-type energy source 17 can handle a fast changing load power during accelerating for example, and the power-type energy source 17 can share the large required power.

In the regenerating mode, the power-type energy source 17, in this embodiment, receives a regeneration power from the traction drive system 11 to be charged. The motor 23 operates as a generator. In another embodiment, the energy-type energy source 15 may also receive the regeneration power. The power-type energy source 17 may receive most of the regeneration power, and the energy-type energy source 15 may receive the rest of the regeneration power. The power-type energy source 17 can receive power quickly.

Figure 4:
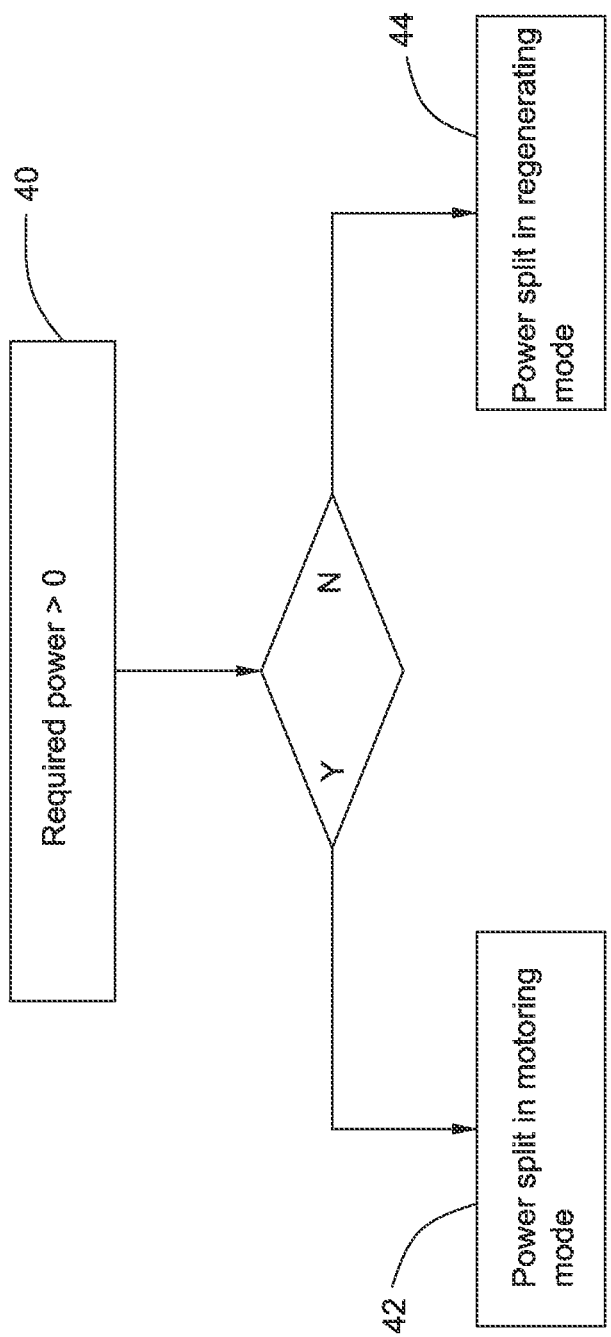
FIGS. 4 to 7 are flow charts of the energy management strategy in accordance with another embodiment.

FIGS. 4 to 7 illustrate flow charts of the energy management strategy in accordance with another embodiment. Referring to FIG. 4, in block 40, the EMS 19 determines if the required power above zero. If the required power is above zero, that is to say, the required power is positive, the required power is split in motoring mode as shown in block 42, otherwise the required power is split in regenerating mode as shown in block 44.

Figure 5:
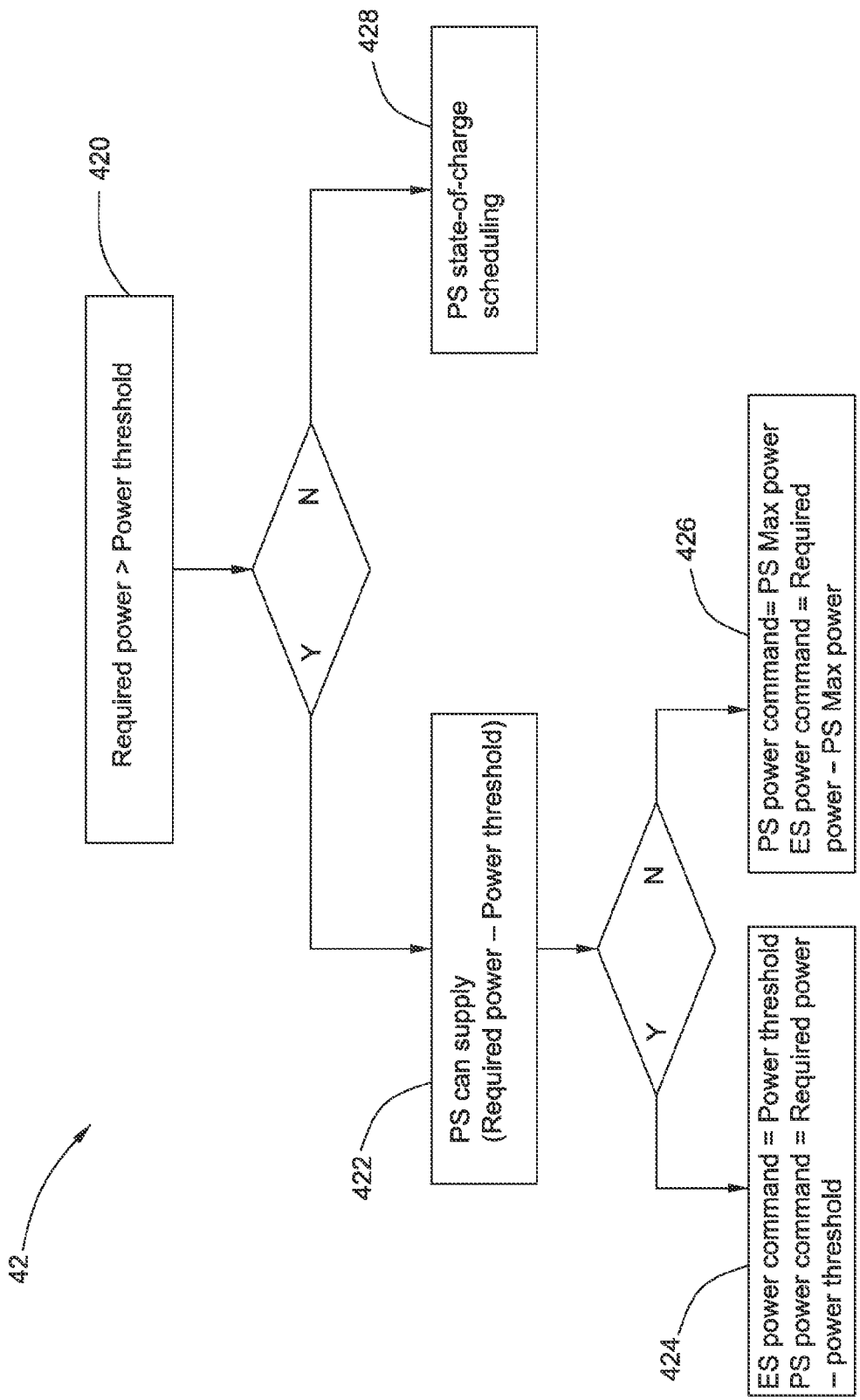

FIG. 5 illustrates a sub-flowchart of power splitting in the motoring mode in block 42 of FIG. 4 in accordance with an embodiment. In block 420, the EMS 19 determines if the required power is higher than the power threshold. In block 422, when the required power is higher than the power threshold, the EMS 19 further determines if the power-type energy source 17 can supply a power that is a difference between the required power and the power threshold. That is to say, the EMS 19 determines if the allowed maximum power of the power-type energy source 17 is higher than the difference between the required power and the power threshold.

In block 424, if the power-type energy source 17 can supply the power, the EMS 19 controls the energy-type energy source 15 to provide a power being equal to the power threshold to the traction drive system 11 and controls the power-type energy source 17 to provide the rest of the required power to the traction drive system 11. The rest of the required power is the difference between the required power and the power threshold, which is less than the allowed maximum power of the power-type energy source 15. Otherwise, in block 426, the EMS 19 controls the power-type energy source 17 to provide the allowed maximum power and controls the energy-type energy source 15 to provide the rest of the required power which is higher than the power threshold. In this condition, the required power is higher than a sum of the allowed maximum power and the power threshold.

In block 428, in the condition that the required power is below the power threshold, the energy-type energy source 15 provides power to the traction drive system 11, and the EMS 19 controls the power-type energy source 17 to provide power or be charged according to a state-of-charge (SoC) thereof. As used herein "SoC" refers to the level of charge of the power-type energy source 17 (the energy remaining in the power-type energy source 17) in comparison to the maximum level of charge for the power-type energy source 17 expressed in a percentage. The SoC of the power-type energy source 17 may be a percentage of a square of a voltage of the power-type energy source 17 in comparison to a square of a maximum voltage capacity thereof.

The energy-type energy source 15 provides power to charge the power-type energy source 17 when a voltage of the power-type energy source 17 is lower than a required voltage, that is to say, when the SoC of the power-type energy source 17 is lower than a required SoC. And the EMS 19 controls the power-type energy source 17 cooperating with the energy-type source 15 to provide power to the traction drive system 11 when the voltage of the power-type energy source 17 is higher than the required voltage, that is to say, when the SoC of the power-type energy source 17 is higher than the required SoC. Accordingly, the voltage of the power-type energy source 17 is maintained around the required voltage so that the SoC of the power-type energy source 17 is maintained around the required SoC.

The voltage of the power-type energy source 17 may be, in one example, measured via a voltage sensor (not shown). The required voltage and the required SoC are determined according to the vehicle speed and inversely proportional to the vehicle speed. The required voltage and the required SoC vary with the change of the vehicle speed. The required voltage and the required SoC of the power-type energy source 17 are determined low when the vehicle runs in high speed, and the required voltage and the required SoC are determined high when the vehicle runs in low speed. Thus, at the high vehicle speed, the SoC is kept low to make sure the power-type energy source 17 is able to receive much energy from regenerative braking. Conversely, at the low vehicle speed, the SoC is kept high to make sure the power-type energy source 17 is ready to provide a high burst of power to accelerate the vehicle.

Figure 6:
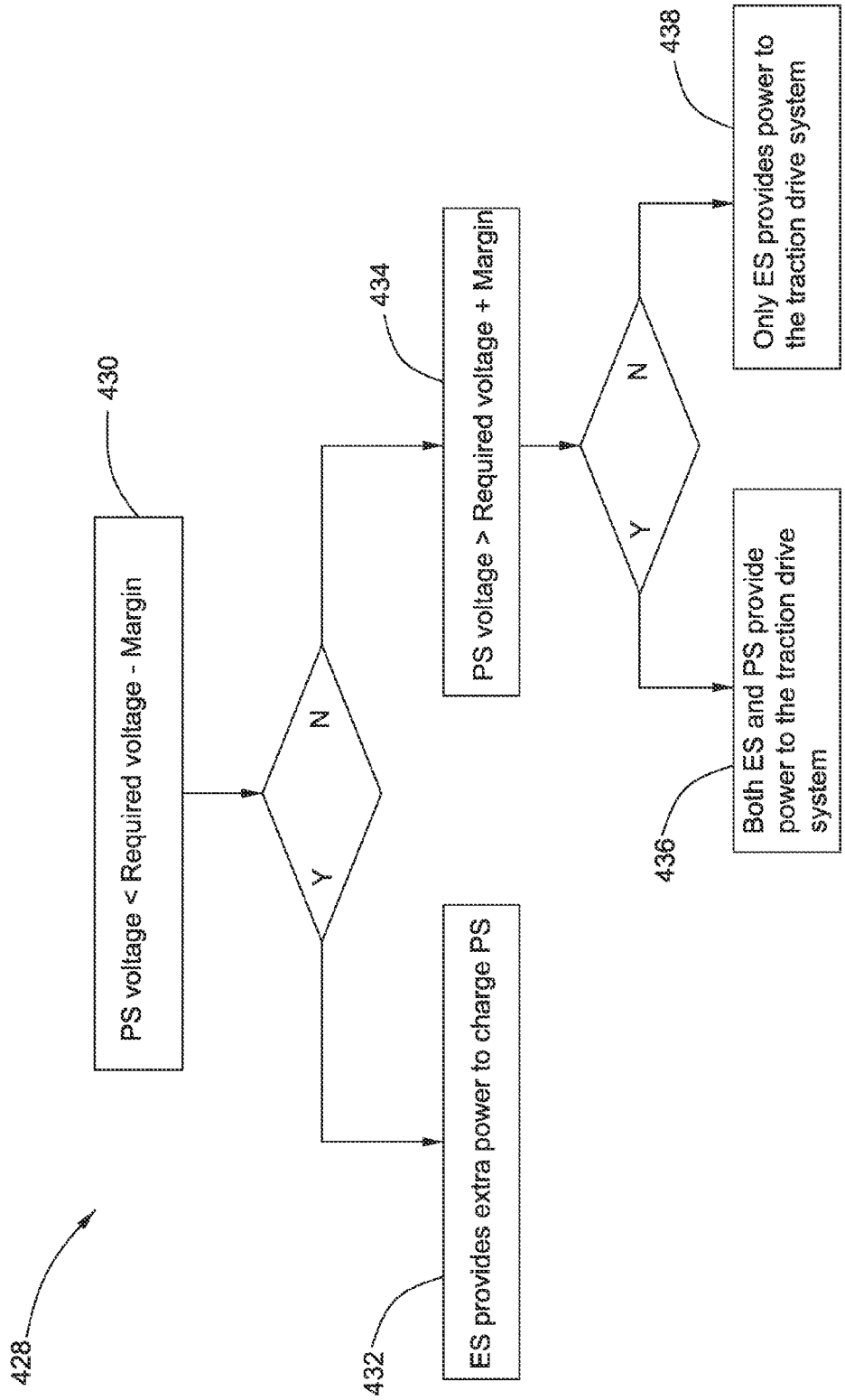

FIG. 6 illustrates a sub-flowchart of the SoC scheduling in block 428 of FIG. 5 in accordance with an embodiment. In block 430, the EMS 19 determines if the voltage of the power-type energy source 17 is lower than the required voltage. In this embodiment, there is a voltage range around the required voltage, which has a narrow band with an upper limit and a lower limit. The upper limit is a little higher than the required voltage and the lower limit is a little lower than the required voltage. For example, the upper limit is the required voltage added by a margin which, in a non-limiting example, is 5 Volt (V), and the lower limit is the required voltage subtracted by the margin or another small value. In this embodiment, the EMS 19 determines if the voltage of the power-type energy source 17 is lower than the lower limit.

In block 432, the energy-type energy source 15 provides extra power to charge the power-type energy source 17 when the voltage of the power-type energy source 17 is lower than the lower limit. Only the energy-type energy source 15 provides the required power to the traction drive system 11 in this condition. In block 434, the EMS 19 further determines if the voltage of the power-type energy source 17 is higher than the upper limit when the voltage of the power-type energy source 17 is not lower than the lower limit. In block 436, the EMS 19 controls both the energy-type energy source 15 and the power-type energy source 17 to provide power to the traction drive system 11 when the voltage of the power-type energy source 17 is higher than the upper limit. In block 438, only the energy-type energy source 15 provides power to the traction system 11 when the voltage of the power-type energy source 17 is in the voltage range. The voltage of the power-type energy source 17 is maintained in the voltage range. The stability of the propulsion system 100 is improved due to the voltage range.

In another embodiment, the EMS 19 may determine if the voltage of the power-type energy source 17 is higher than the upper limit, and then determine if the voltage of the power-type energy source 17 is lower than the lower limit when the voltage is not higher than the upper limit. Operations of the propulsion system 100 in different conditions are as same as the operations in the embodiment described above.

Figure 7:
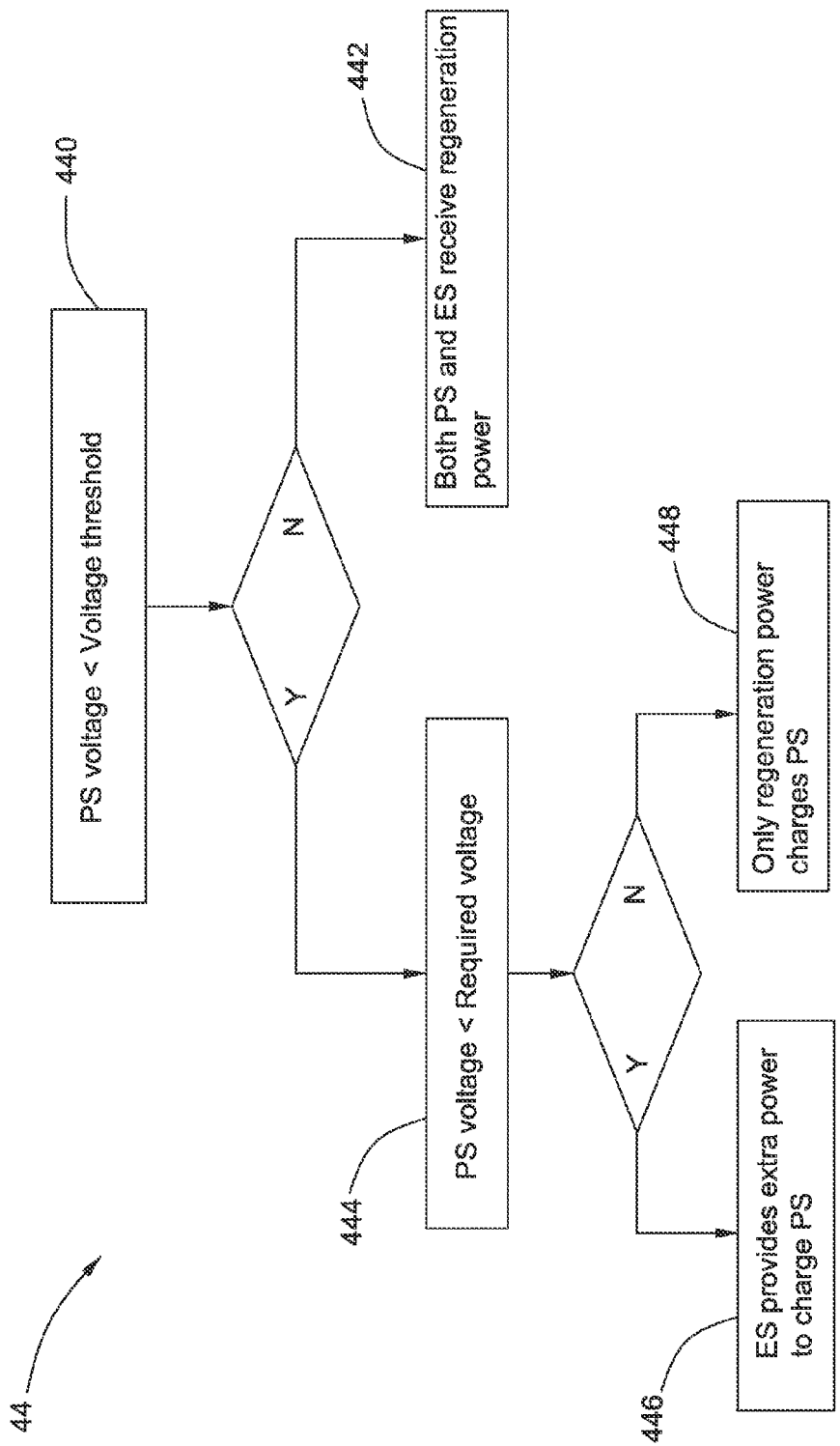

FIG. 7 illustrates a sub-flowchart of power splitting in the regenerating mode in block 44 of FIG. 4 in accordance with an embodiment. In block 440, the EMS 19 determines if the voltage of the power-type energy source 17 is lower than a voltage threshold. The voltage threshold is lower than a maximum voltage capacity of the power-type energy source 17 so that a SoC threshold corresponding to the voltage threshold is less than 100%. For example, the SoC threshold is 90%. It should be noted that this example is merely illustrative and is non-limiting. In block 442, if the voltage of the power-type energy source 17 is not lower than the voltage threshold, a part of regeneration power from the traction drive system 11 is received by the energy-type energy source 15. The power-type energy source 17 receives the regeneration power at a fast rate, and the energy-type energy source 15 receives the regeneration power at a low rate. In this condition, both the energy-type energy source 15 and the power-type energy source 17 are charged so as to slow down the rise in the voltage of the power-type energy source 17, thus the power-type energy source 17 always has capability to receive power.

The EMS 19 is configured to control the power-type energy source 17 to be charged by the regeneration power from the traction drive system 11 when the voltage of the power-type energy source 17 is lower than the voltage threshold during the regenerating mode. In this condition, only the power-type energy source 17 receives the regeneration power. In this embodiment, in block 444, the EMS 19 further determines if the voltage of the power-type energy source 17 is lower than the required voltage when the voltage of the power-type energy source 17 is lower than the voltage threshold. The voltage threshold is larger than the required voltage. In block 446, the energy-type energy source 15 provides power to charge the power-type energy source 17 when the voltage of the power-type energy source 17 is lower than the required voltage. This operation described herein is similar to the corresponding operation that the power-type energy source 17 is charged by the energy-type energy source 15 in the motoring mode. In block 448, only the regeneration power charges the power-type energy source 17 when the voltage of the power-type energy source 17 is between the required voltage and the voltage threshold.

In the embodiments described above, there are a number of threshold values, such as the required power, the power threshold, the required voltage, the upper and lower limits of the voltage range, the voltage threshold and so on, utilized to separate different operation conditions. The propulsion system 100 can operate in one of the different operation conditions or another one of the different operation conditions when the threshold values are just reached. For example, in the embodiment illustrated in FIG. 5, when the required power reaches the power threshold, the EMS 19 performs the operation in the block 428. In another embodiment, when the required power reaches the power threshold, the EMS 19 may perform the operation in the block 422. The energy management strategy in the embodiments described above is established according to certain rules and fully considering characters and statuses of the energy sources to improve driving efficiency of the energy management strategy.

Figure 8:
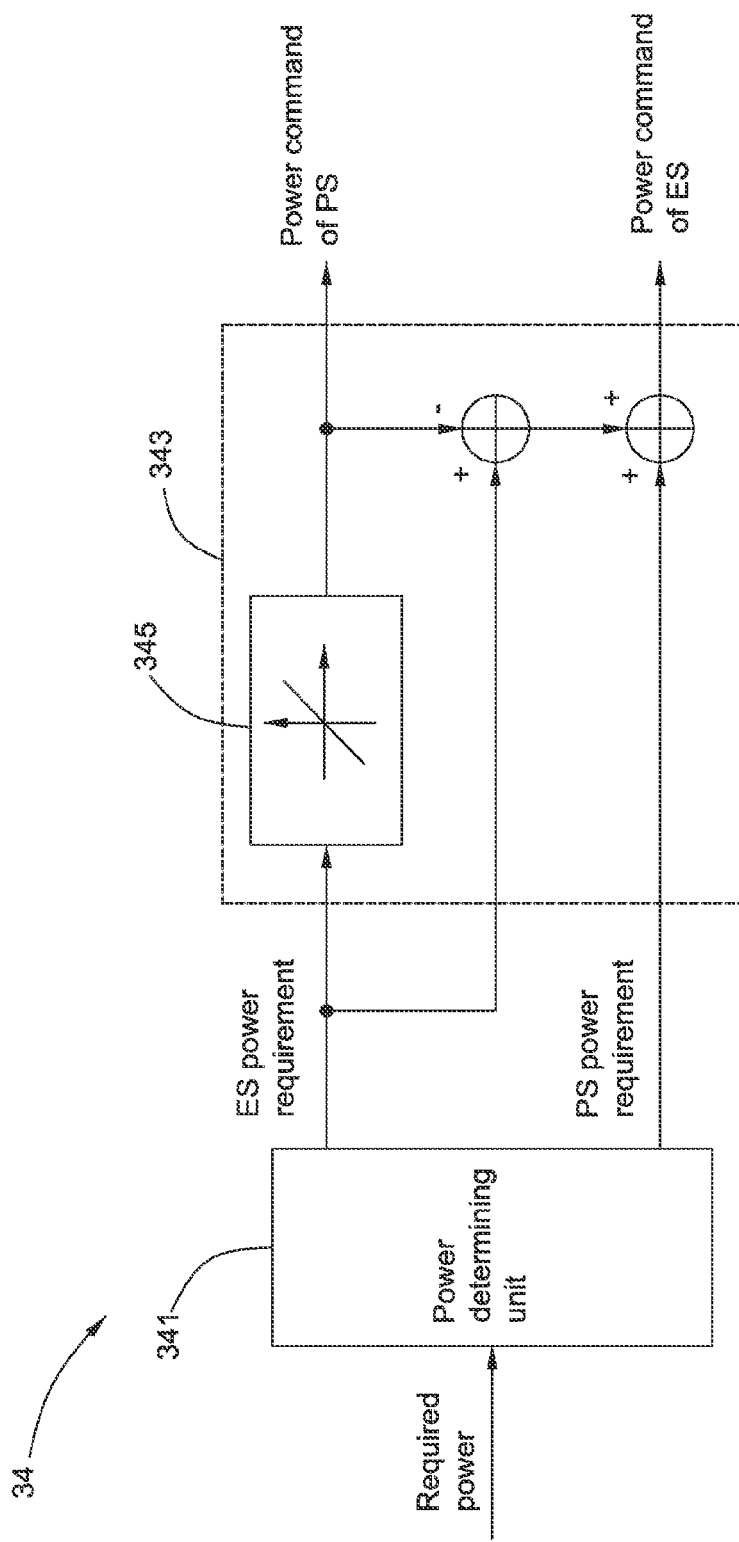
FIG. 8 is a schematic diagram of a power splitting device of the energy management system of FIG. 2 in accordance with an embodiment.

FIG. 8 illustrates a schematic diagram of the power splitting device 34 of FIG. 2 in accordance with an embodiment. In this embodiment, the power splitting device 34 includes a power determining unit 341 and a power optimizing unit 343. The power determining unit 341 is configured to splitting the required power based on the energy management strategy in FIGS. 3 to 7 to generate power requirements of the energy-type energy source 15 and the power-type energy source 17. The power optimizing unit 343 includes a slew rate limiter 345 configured to limit the dynamic change rate of the power requirement of the energy-type energy source 15 to generate the power command of the energy-type energy source 15. The power requirement of the energy-type energy source 15 used herein includes a power provided and received by the energy-type energy source 15. Accordingly, a decreasing or increasing rate of the power requirement of the energy-type energy source 15 is not larger than a certain value determined in the slew rate limiter 345. The certain value may be determined according to characters of the energy-type energy source 15, and regulated for the different energy-type energy source 15.

A difference between the power requirement and the power command of the energy-type energy source 15 is added to the power requirement of the power-type energy source 17 to generate the power command of the power-type energy source 17, such that a sum of the power commands of the energy-type energy source 15 and the power-type energy source 17 is equal to a sum of the power requirements of the energy-type energy source 15 and the power-type energy source 17. The power-type energy source 17 can handle the high burst of power so that the required power may have a high change rate when accelerating or braking rapidly, for example.

Referring to FIGS. 5 to 8, in the blocks 424 and 426 of FIG. 5, the blocks 432, 436 and 438 of FIG. 6, and the blocks 442, 446 and 448 of FIG. 7, the dynamic change rate of power of the energy-type energy source 15 is limited via the slew rate limiter 345, and the power commands of the energy-type energy source 15 and the power-type energy source 17 are determined as described above. The energy-type energy source 15 and the power-type energy source 17 provide or receive power according to the corresponding power commands.

While embodiments of the invention have been described herein, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

What is claimed is:

1. A propulsion system, comprising:
   a boost converter comprising a high voltage side and a low voltage side;
   a traction drive system coupled to the high voltage side of the boost converter;
   an energy-type energy source coupled to the low voltage side of the boost converter;
   a power-type energy source coupled to the low voltage side of the boost converter; and
   an energy management system configured to control the boost converter when the traction drive system is in a motoring mode such that:
   the energy-type energy source provides power to the traction drive system when a required power for the traction drive system is below a power threshold; and
   both the energy-type energy source and power-type energy source provide power to the traction drive system when the required power for the traction drive system is above the power threshold, wherein providing power from both the energy-type energy source and power-type energy source comprises:
   providing power from the energy-type energy source about equal to the power threshold and providing a remaining power of the required power from the power-type energy source when an allowed maximum power of the power-type energy source is greater than the remaining power; and
   providing the allowed maximum power from the power-type energy source and providing the remaining power from the energy-type energy source when the allowed maximum power is less than the remaining power.

2. The propulsion system of claim 1, wherein the energy management system is further configured such that the power-type energy source provides power to the traction drive system when a voltage of the power-type energy source is higher than a required voltage when the required power is below the power threshold.

3. The propulsion system of claim 1, wherein the energy-type energy source is configured to provide power to charge the power-type energy source when a voltage of the power-type energy source is lower than a required voltage.

4. The propulsion system of claim 1, wherein the energy management system is further configured to control the boost converter when the traction drive system is in a regenerative mode such that the power-type energy source is charged by the traction drive system when a voltage of the power-type energy source is lower than a regenerative voltage threshold.

5. The propulsion system of claim 1, wherein the energy management system is further configured to control the boost converter when the traction drive system is in a regenerative mode such that both the energy-type energy source and the power-type energy source are charged by the traction drive system when a voltage of the power-type energy source is higher than a regenerative voltage threshold.

6. The propulsion system of claim 1, wherein the boost converter is coupled to the traction drive system via a pair of direct current (DC) links, and the energy management system is further configured to determine the required power according to a predetermined voltage of the DC links and a measured voltage of the DC links.

7. The propulsion system of claim 6, wherein the energy management system is further configured to estimate an estimated load power of the traction drive system and determine the required power according to the estimated load power.

8. The propulsion system of claim 1, wherein the energy management system comprises a slew rate limiter.

9. A method for providing power to a traction drive system from an energy-type energy source and a power-type energy source, the method comprising:
   providing power to the traction drive system from the energy-type energy source when a required power for the traction drive system is below a power threshold; and
   providing power to the traction drive system from both the energy-type energy source and power-type energy source when the required power for the traction drive system is above a power threshold, wherein providing power from both the energy-type energy source and power-type energy source comprises:
   providing power from the energy-type energy source about equal to the power threshold and providing a remaining power of the required power from the power-type energy source when an allowed maximum power of the power-type energy source is greater than the remaining power; and
   providing the allowed maximum power from the power-type energy source and providing the remaining power from the energy-type energy source when the allowed maximum power is less than the remaining power.

10. The method of claim 9, further comprising charging the power-type energy source by the energy-type energy source when a voltage of the power-type energy source is lower than a required voltage.

11. The method of claim 9, further comprising charging the power-type energy source from the traction drive system when a voltage of the power-type energy source is lower than a regenerative voltage threshold.

12. The method of claim 9, further comprising charging both the energy-type energy source and the power-type energy source from the traction drive system when a voltage of the power-type energy source is higher than a regenerative voltage threshold.

13. The method of claim 9, further comprising determining the required power according to a predetermined voltage for the traction drive system and a measured voltage applied to the traction drive system.

14. The method of claim 13, wherein determining the required power comprises estimating an estimated load power of the traction drive system and determining the required power according to the estimated load power.

15. The propulsion system of claim 1, wherein the boost converter is a multi-channel bi-directional boost converter.

16. The propulsion system of claim 15, wherein the energy-type energy source is coupled to a first channel on the low side of the boost converter, and the power-type energy source is coupled to a second channel on the low side of the boost converter.

17. The propulsion system of claim 1, wherein the energy-type energy source comprises a battery.

18. The propulsion system of claim 1, wherein the power-type energy source comprises an ultracapacitor.

19. The propulsion system of claim 1, wherein the traction drive system comprises an inverter coupled to an AC motor.

20. A propulsion system, comprising:
- a boost converter comprising a high voltage side and a low voltage side;
- a traction drive system coupled to the high voltage side of the boost converter;
- a battery coupled to the low voltage side of the boost converter;
- an ultracapacitor coupled to the low voltage side of the boost converter; and
- an energy management system configured to control the boost converter when the traction drive system is in a motoring mode such that:
  - the battery provides power to the traction drive system when a required power for the traction drive system is below a power threshold; and
  - both the battery and ultracapacitor provide power to the traction drive system when the required power for the traction drive system is above the power threshold, wherein providing power from both the battery and ultracapacitor comprises:
    - providing power from the battery about equal to the power threshold and providing a remaining power of the required power from the ultracapacitor when an allowed maximum power of the ultracapacitor is greater than the remaining power; and
    - providing the allowed maximum power from the ultracapacitor and providing the remaining power from the battery when the allowed maximum power is less than the remaining power.

* * * * *